Patented Oct. 27, 1942

2,299,740

UNITED STATES PATENT OFFICE 2,299,740

COPOLYMERIZATION PRODUCT OF VINYL HALIDES AND NUCLEARLY HALOGENATED ARYLALKANOL ESTERS OF ACRYLIC ACID

Gaetano F. D'Alelio, Pittsfield, Mass., assignor to General Electric Company, a corporation of New York No Drawing. Application November 25, 1940, Serial No. 367,116

5 Claims. (Cl. 260—84)

This invention relates broadly to the production of new and valuable synthetic compositions and more particularly is concerned with compositions of matter comprising a copolymerization (interpolymerization) product of a polymerizable mixture comprising essentially a vinyl halide, e. g., vinyl chloride, and at least one arylalkanol ester of acrylic acid, e. g., halogenated or non-halogenated benzyl acrylate. These new copolymer compositions are characterized by their improved internal plasticity and greater compatibility with plasticizers and stabilizers than similar compositions derived from vinyl halides heretofore known or suggested.

The arylalkanol esters of acrylic acid used in carrying the present invention into effect may be described more specifically as esters having the graphic formula:

$$CH_2=CH-COO(CR_2)_n-Z$$

where $n$ is an integer and is at least 1, R represents hydrogen or any monovalent organic radical, and Z represents any aryl (mono or poly) radical. Thus, R may be either hydrogen or a monovalent organic radical such, for example, as alkyl (e. g., methyl, ethyl, propyl, butyl, amyl, etc.), aryl (e. g., phenyl, etc.) alkaryl (e. g., alkphenyl, etc.), aralkyl (e. g., tolyl, phenethyl, etc.), acyl, naphthyl, hydrocyclic, heterocyclic, etc., or nitro, halogeno, aceto, carbalkoxy, acetoxy, etc., derivatives of such radicals. Z in the above formula may be, for instance, any substituted or unsubstituted, mono or poly aryl radical, e. g., phenyl, halogeno-aryl (e. g., halogeno-phenyl), nitro-aryl (e. g., nitro-phenyl), alkylated aryl e. g., alkylated phenyl), hydroxylated aryl (e. g., hydroxy phenyl), alkoxy aryl (e. g., alkoxy phenyl), aryloxy aryl (e. g., phenoxy phenyl), acetoxy aryl (e. g., acetoxy phenyl), carbalkoxy aryl (e. g., carbalkoxy phenyl), aryl phenyl (e. g., di-phenyl), naphthyl, etc.

In producing my new synthetic compositions the main polymerizable reactants preferably, although not necessarily, are polymerized in the presence of a relatively small proportion, not exceeding substantially 0.5% by weight (of the mixture of monomers or partial polymers) of another polymerizable organic compound having at least one

grouping and at least one additional polymerizable grouping (e. g., one or more additional

groupings), an illustrative example being allyl acrylate. As pointed out more fully hereafter, the introduction into the aryl nucleus (Z in the above formula) of an acrylic alkanol grouping $[CH_2=CH-COO(CH_2)_n-$ in the above formula] influences not only the internal plasticity of the copolymer of vinyl halide and arylalkanol acrylic ester, but also the compatibility of such a copolymer with plasticizers and stabilizers.

Table I shows the differences in the internal plasticizing effect of arylalkanol acrylic esters, specifically benzyl acrylate and ortho- and para-chlorbenzyl acrylates, as compared with copolymers of vinyl chloride and other acrylyl type monomers, specifically ethyl acrylate and ethyl methacrylate. The approximate copolymer composition at which the product is too soft to measure its flexural strength properly may be taken as a measure of its internal plasticity. The more effective the acrylyl ester as an internal plasticizer of the composition, the greater is the amount of vinyl chloride that can be tolerated in the copolymer.

*Table I*

| Materials copolymerized | Percentages by weight of monomers yielding copolymers that were too soft to measure their flexural strength |
|---|---|
| Vinyl chloride and ethyl methacrylate | (¹) |
| Vinyl chloride and ethyl acrylate | 50–50 |
| Vinyl chloride and benzyl acrylate | 60–40 |
| Vinyl chloride and orthochlorbenzyl acrylate | 70–30 |
| Vinyl chloride and parachlorbenzyl acrylate | 70–30 |

¹ In all proportions of monomers the copolymer was never too soft to measure its flexural strength.

From the results shown in Table I it will be seen that when a preponderant proportion of vinyl halide, specifically vinyl chloride, is copolymerized with a lesser but substantial proportion of an arylalkanol acrylic ester, specifically benzyl acrylate and ortho- and para-chlorbenzyl acrylates, the product shows at least 20% improved plasticity by using benzyl acrylate as compared with ethyl acrylate and as high as 40% improved plasticity over ethyl acrylate when ortho- or para-chlorbenzyl acrylate is used.

It is generally known that as the plasticity of a resin increases, the flexural strength decreases. It was surprising, therefore, that when a comparison, under identical conditions, was made of vinyl halide copolymer compositions of this invention with vinyl halide copolymers wherein other acrylic esters were used, specifically ethyl acrylate and ethyl methacrylate, the results shown in Table II were obtained.

Table II

| Composition of copolymer | | Dynstat flexural strength in lbs./sq. in. |
|---|---|---|
| Percent by weight, monomer | Percent by weight, monomer | |
| 80 vinyl chloride | 20 ethyl acrylate | 6,400 |
| 80 vinyl chloride | 20 ethyl methacrylate | 7,920 |
| 80 vinyl chloride | 20 ortho-chlorbenzyl acrylate | 9,905 |
| 80 vinyl chloride | 20 benzyl acrylate | 11,010 |

That the arylalkanol acrylic esters, even when constituting a comparatively small amount of the copolymer, have marked internal plasticizing effect, thereby eliminating brittleness, is shown by the data given in Table III, which represents the results on samples produced and tested under identical conditions.

Table III

| Composition of copolymer, percent by weight | | Dynstat tests on copolymer made with ortho-chlorbenzyl acrylate | | Dynstat tests on copolymer made with para-chlorbenzyl acrylate | |
|---|---|---|---|---|---|
| Vinyl chloride | Ortho- or para-chlorbenzyl acrylate | Flexural strength in lbs./sq. in. | Impact strength in ft. lbs./sq. in. | Flexural strength in lbs./sq. in. | Impact strength in ft. lbs./sq. in. |
| 100 | 0 | 240 to 6,000 | 0.012 to 0.05 | | |
| 98 | 2 | 13,600 | 0.087 | 13,365 | 0.081 |
| 95 | 5 | 14,780 | 0.077 | 12,685 | 0.110 |
| 90 | 10 | 10,650 | 0.069 | 11,060 | 0.860 |

A main advantage that accrues from my invention is the simplicity and ease with which plasticization of the vinyl halide component is effected. In order to plasticize polymerized vinyl halide or the heretofore known vinyl halide copolymer compositions it has been necessary extensively to mill the compound with the plasticizing agent, e. g., triphenyl phosphate, tricresyl phosphate, dibenzyl sebacate, di-(tetrahydrofurfuryl) phthalate, di-(butoxyethyl) phthalate, etc., in order to obtain a homogeneous composition. This has been costly and time-consuming. Depending upon the proportions of components used in preparing the conjoint polymerization products of this invention, milling of the copolymer with an added plasticizer either is eliminated entirely, or, if a plasticizer is added, the time of milling to obtain a homogeneous composition greatly is reduced as compared with the usual milling time for plasticizing poly-vinyl halide and the known copolymers of vinyl halide with other copolymerizable materials.

When added plasticizers of the polymerizing or non-polymerizing type are incorporated into these new products of conjoint polymerization of vinyl halides and arylalkanol acrylic esters, I prefer to use as the plasticizer an organic compound containing a carbocyclic grouping, more particularly at least one halogenated, specifically chlorinated, arylalkanol mono- or poly-ester of a saturated or unsaturated, mono- or poly-carboxylic acid, e. g., bis-(parachlorbenzyl) sebacate, bis-(di-chlorbenzyl) sebacate, di-(ortho-chlorbenzyl) adipate, etc. Compositions comprising such arylalkanol esters are disclosed and claimed in my copending application Serial No. 367,117, filed concurrently herewith and assigned to the same assignee as the present invention. Because of the solvation characteristics of the carbocyclic groups in the copolymers of this invention, these compositions also readily may be plasticized with added plasticizers containing no carbocyclic group, e. g., diethylene glycol dihexoate, di-(butoxyethyl) sebacate, etc. Of course, other plasticizers that are compatible with these new copolymers, e. g., tricresyl phosphate, dibenzyl sebacate, etc., also may be employed to impart additional plasticity to those copolymers which, because of the proportions of components employed, initially may not have sufficient plasticity for the particular application.

Another advantage that accrues from my invention is that the presence of the carbocyclic group, specifically the aryl group in the copolymer, causes the material to be more compatible with heat, light and electric stabilizers than polyvinyl halide and the previously known copolymers of vinyl halide. The most effective class of stabilizers are the lead derivatives of phenol and substituted phenols, that is, hydroxy aryl compounds, for example cresols, xylenols, salicyclic esters, naphthols, etc. Thus, clear and more uniform stabilized compositions are obtained when a copolymer resulting from the polymerization of a mixture comprising essentially vinyl halide and an arylalkanol acrylic ester is stabilized with, for example, lead phenates than are obtained with polyvinyl halide or other vinyl halide copolymers. Lead para-chloro phenate, lead phenyl phenate and lead tertiary amyl phenates are particularly adapted to the stabilization of the products of this invention. That the nature of the substituents attached to the aryl radical (Z in the formula given previously herein) has a material influence upon the plasticity characteristics of the copolymer, as well as upon its compatibility with added plasticizers and stabilizers is shown by the fact that a copolymer of, for example, chlorbenzyl acrylate and vinyl chloride will cast to a clearer mass than a copolymer composition similarly made by interpolymerization of benzyl acrylate and vinyl chloride. The internal plasticity and compatibility with halogenated plasticizer of the former copolymer is greater than that of the latter.

If halogeno-arylalkanol acrylic esters are employed, they may be either mono- or polyhalogeno derivatives, for example, mono-, di-, tri-, tetra-, or penta-chlorbenzyl acrylates, or mixtures thereof.

In cases where increased resistance to solvents is desired, small amounts of crosslinking agents (polymerizable organic compounds) containing a plurality of polymerizable groupings at least one of which is a

grouping may be used internally to modify the compositions of this invention without impairing their other desirable characteristics. As examples of such crosslinking agents may be mentioned glycol dimethylacrylate, allyl methacrylate, methallyl acrylate, methallyl methacrylate, 2-chlorallyl acrylate, glyceryl di- and tri-acrylates, allyl itaconate, vinyl oxalate, glycol itaconates, etc. Additional examples of crosslinking agents are given in various copending applications of mine, for instance in copending application Serial No. 313,103, filed January 9, 1940 and assigned to the same assignee as the present invention, and in copending applications referred to in that application.

These new synthetic resinous compositions comprising a copolymer of vinyl halide and arylalkanol acrylic ester may be mixed or compounded with other compatible synthetic resins and elastomers, such as, for example: polymers and copolymers of other acrylic esters; polymers and copolymers of alkacrylic (e. g., methacrylic, ethacrylic, etc.) esters; vinyl compounds such as polymerized vinyl esters of aliphatic acids and polymerized vinyl hydrocarbons; other copolymers, e. g., copolymers of vinyl chloride and vinyl acetate; vinyl chloride and a diene, e. g., 2-chlorbutadiene-1,3, etc.; polymers and copolymers of vinylidene halides, specifically vinylidene chloride, of chloracrylic esters, of nuclearly halogenated styrene, etc.; natural gums and rubbers; synthetic rubbers such as, for example, the polymerized 1,3-dienes, e. g., butadiene-1,3, 2-chloro-butadiene-1,3, 2,3-dichloro-butadiene-1,3, 2-carbalkoxy-butadiene-1,3, 2,3-dicarbalkoxy-butadiene-1,3—polymerized alone, or in the form of mixtures thereof, or with other organic compounds containing one or more

groupings; modified or unmodified polyalkylenes, e. g., polyisobutylene, polyisoamylene, etc.; copolymers of mono-olefines and poly-olefines; etc. In some cases the copolymers comprising vinyl halide and arylalkanol acrylic ester may be formed in the presence of monomeric or partially polymerized organic compounds such as above mentioned. Those compositions or mixtures of compounds that are vulcanizable of course may be vulcanized with the usual vulcanizing agents. The vulcanized products, therefore, also are comprehended within the scope of this invention.

The copolymers of this invention may be prepared by methods now well known to the art, for instance under polymerization influences such as described in my above-identified copending application Serial No. 313,103.

Of course it will be understood by those skilled in the art that my invention is not limited to the use of monomeric or partly polymerized vinyl chloride as the reactant which is copolymerized with monomeric or partly polymerized arylalkanol acrylic ester. Thus, instead of polymerizable vinyl chloride, other polymerizable vinyl halides may be employed, for example monomeric or partly polymerized vinyl bromide or vinyl iodide. Mixtures of different vinyl halides also may be used in forming the copolymer with an arylalkanol acrylic ester. Compositions comprising polymerization products of vinyl iodides should be avoided where resistance to discoloration at elevated temperature is important.

The various compositions and mixtures containing the copolymer of vinyl halide and arylalkanol acrylic ester have a wide variety of industrial applications. Thus, with or without fillers, e. g., asbestos, they may be used as insulation material, for instance as insulation for electrical conductors. The extrudable compositions may be extruded at temperatures of the order of 100° to 175° C. upon a conductor core, e. g., a copper wire, or the soluble compositions may be applied in the form of a varnish and the varnish baked upon the wire. They also may be employed in the production of molding compositions and molded articles, as adhesives, coating and impregnating agents, etc.

What I claim as new and desire to secure by Letters Patent of the United States is:

1. A synthetic composition comprising the polymerization product of a polymerizable mixture comprising essentially vinyl halide and a nuclearly halogenated arylalkanol ester of acrylic acid.

2. A composition as in claim 1 wherein the nuclearly halogenated arylalkanol ester of acrylic acid is a chlorbenzyl acrylate.

3. A composition comprising the polymerization product of a mixture containing, by weight, 98% vinyl chloride and 2% para-chlorbenzyl acrylate.

4. A composition comprising the polymerization product of a mixture containing by weight from 90 to 98% of a vinyl halide and from 2 to 10% of a nuclearly halogenated benzyl acrylate.

5. A composition comprising the polymerization product of a mixture containing by weight 95% vinyl chloride and 5% ortho-chlorbenzyl acrylate.

GAETANO F. D'ALELIO.

CERTIFICATE OF CORRECTION.

Patent No. 2,299,740.　　　　　　　　　　　　　　　　October 27, 1942.

GAETANO F. D'ALELIO.

It is hereby certified that error appears in the printed specification of the above numbered patent requiring correction as follows: Page 1, second column, line 5, for that portion of the formula reading "$(CH_2)_n$" read --$(CR_2)_n$--; and that the said Letters Patent should be read with this correction therein that the same may conform to the record of the case in the Patent Office.

Signed and sealed this 1st day of December, A. D. 1942.

Henry Van Arsdale,
　　　　　　　　　　　　　　　　　Acting Commissioner of Patents.

(Seal)